United States Patent [19]

Hancock

[11] Patent Number: 5,074,161
[45] Date of Patent: Dec. 24, 1991

[54] VEHICLE STEERING COLUMN INCORPORATING MEANS TO DECOUPLE IT

[75] Inventor: Michael T. Hancock, Coventry, England

[73] Assignee: The Torrington Company, Torrington, Conn.

[21] Appl. No.: 513,128

[22] Filed: Apr. 23, 1990

[30] Foreign Application Priority Data

May 11, 1989 [GB] United Kingdom ............... 8910882
Jun. 23, 1989 [GB] United Kingdom ............... 8914499

[51] Int. Cl.⁵ .......................................... B62D 1/16
[52] U.S. Cl. .................................. 74/492; 280/777
[58] Field of Search ............... 74/492; 280/777, 779; 403/2

[56] References Cited

U.S. PATENT DOCUMENTS

| 3,424,263 | 12/1966 | Black. | |
| 3,600,971 | 8/1971 | Scarvelis et al. | 74/492 |
| 3,923,319 | 12/1975 | Nonaka et al. | |
| 4,014,219 | 3/1977 | Feustel | 74/492 |
| 4,411,167 | 10/1983 | Mohr | 74/492 |
| 4,504,164 | 3/1985 | Bien | 74/492 |
| 4,535,645 | 8/1985 | De Bisschop | 74/492 |
| 4,730,508 | 3/1988 | Haldric et al. | 74/492 |
| 4,911,034 | 3/1990 | Kulczyk | 74/492 |
| 4,927,174 | 5/1990 | Jones | 280/777 |

FOREIGN PATENT DOCUMENTS

| 2491854 | 4/1982 | France | 74/492 |
| 1174540 | 12/1969 | United Kingdom. | |
| 1228611 | 4/1971 | United Kingdom. | |
| 2194922A | 3/1988 | United Kingdom. | |

Primary Examiner—Gary L. Smith
Assistant Examiner—F. Saether
Attorney, Agent, or Firm—Michael H. Minns

[57] ABSTRACT

A vehicle steering column is decoupled in the event of a frontal impact of the vehicle to prevent frontal crash forces from reaching the upper steering column. A releasable coupling interconnects upper and lower portions of the steering column and includes a clamping arrangement normally to clamp the two portions together. The clamping arrangement is released upon forcible shifting of the lower portion towards the upper portion.

21 Claims, 9 Drawing Sheets

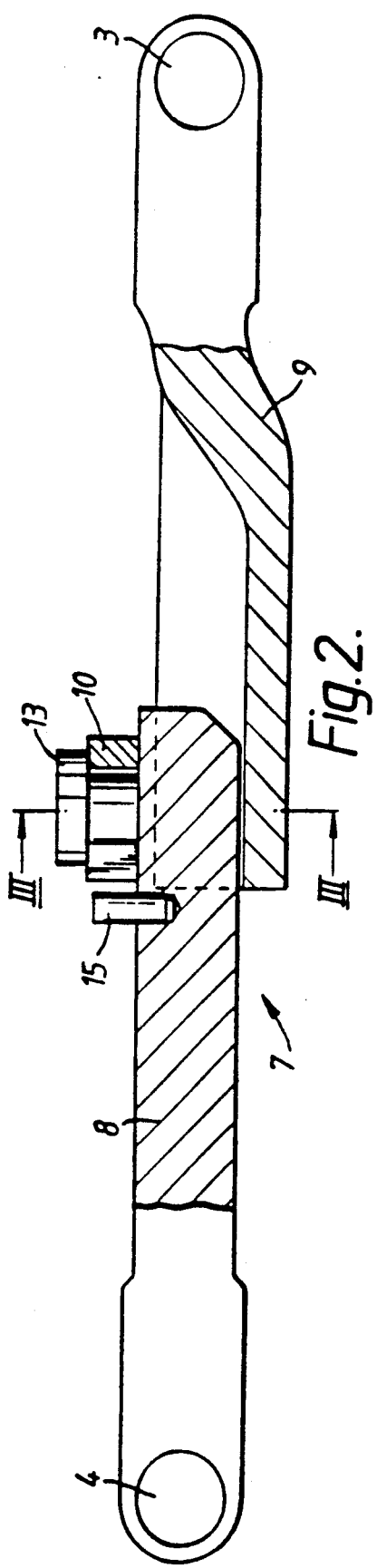
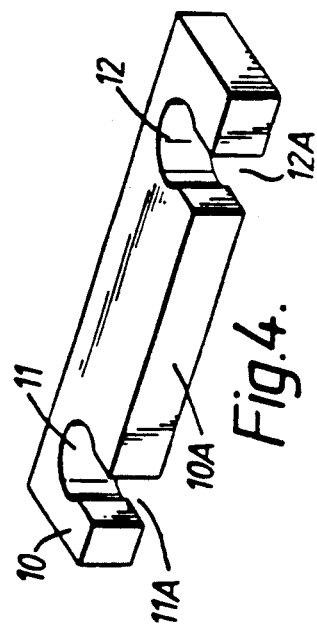
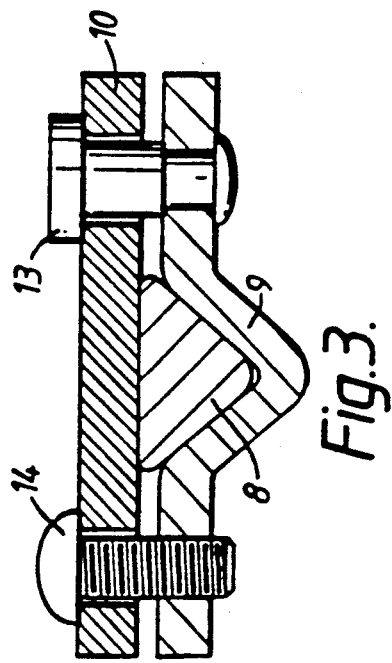
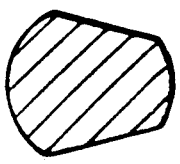
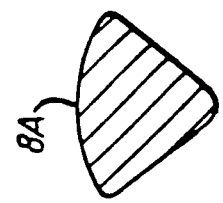
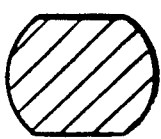

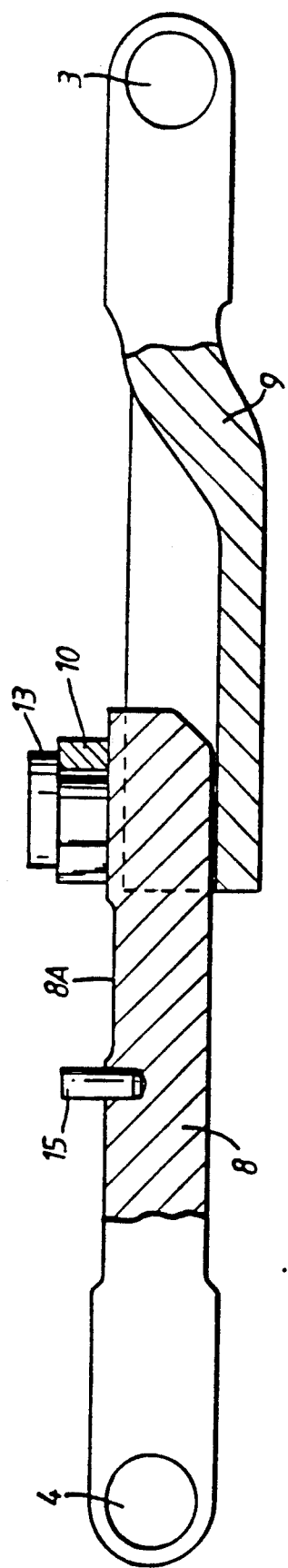
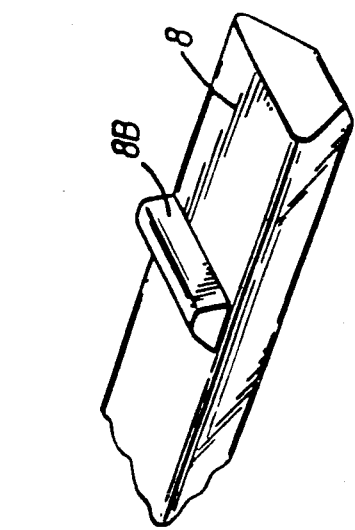
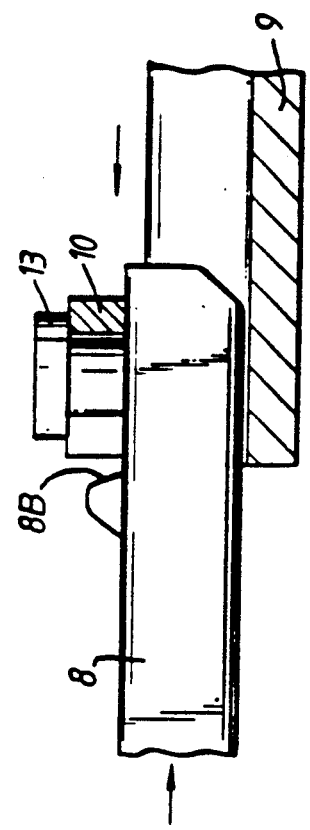

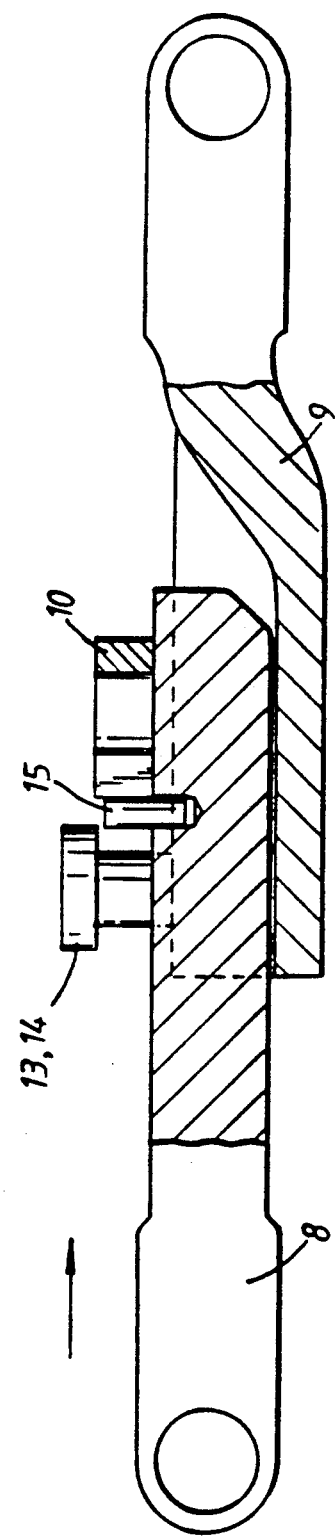
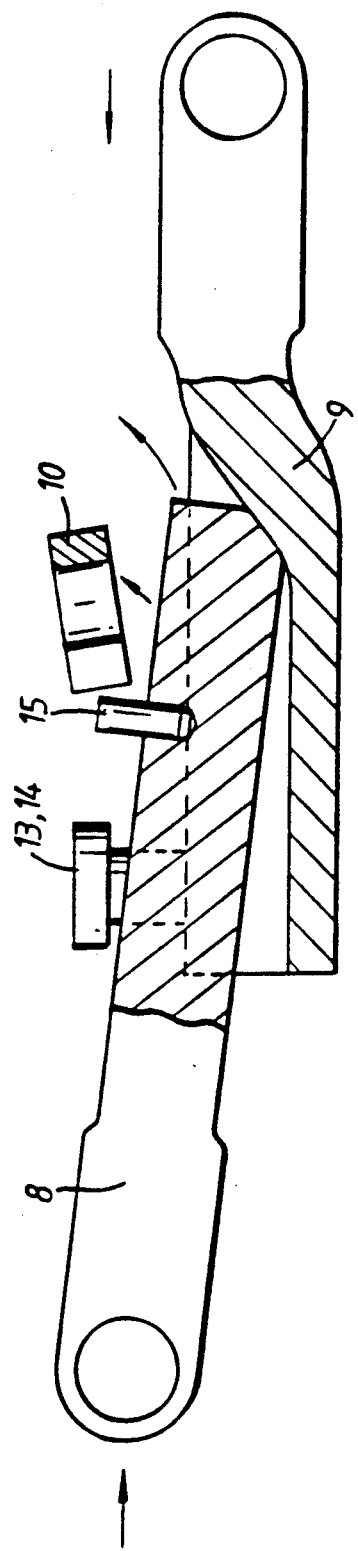
Fig. 7.
Fig. 8.

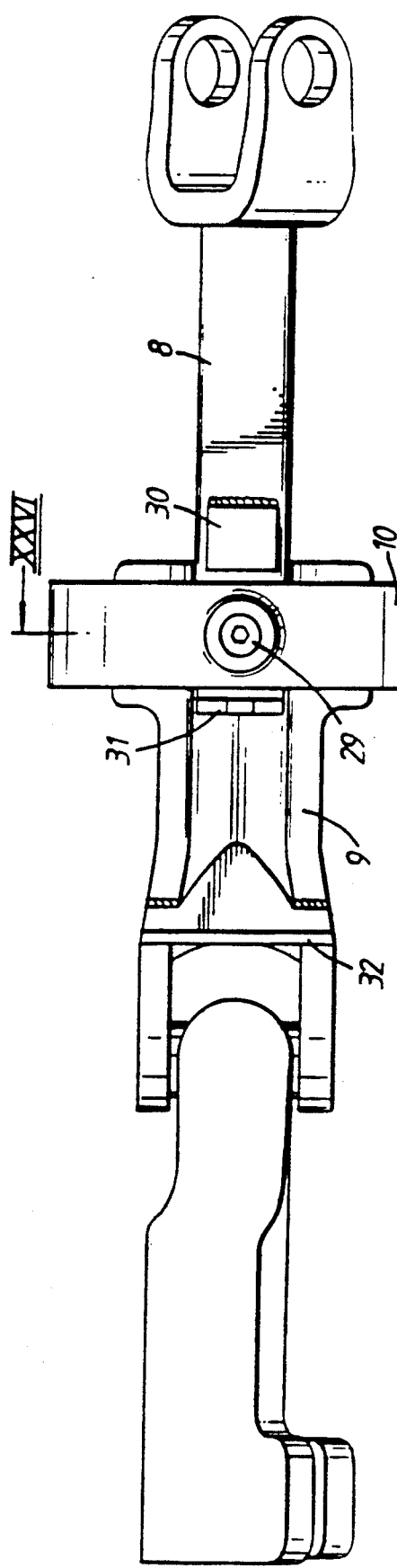
Fig.25.
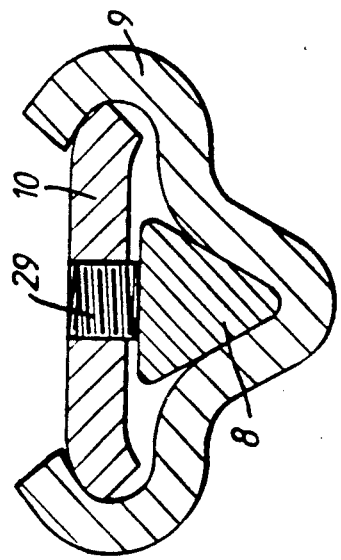
Fig.28.
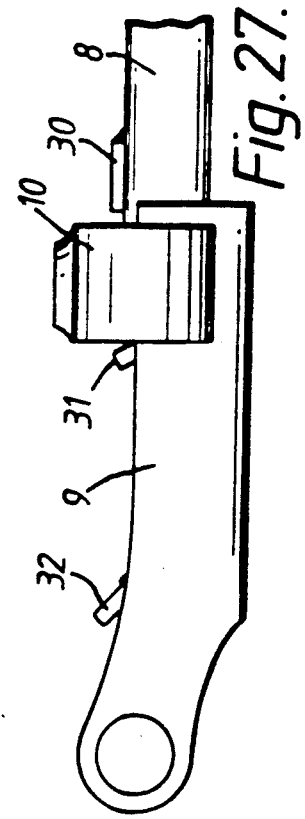
Fig.27.
Fig.26.

VEHICLE STEERING COLUMN INCORPORATING MEANS TO DECOUPLE IT

This invention relates to a vehicle steering column incorporating means to decouple it in the event of a frontal impact of the vehicle.

The decoupler prevents frontal crash forces on the vehicle from reaching the upper steering column.

According to the present invention, there is provided a vehicle steering column incorporating means to decouple it in the event of a frontal impact of the vehicle, said means comprising a releasable coupling interconnecting upper and lower portions of a steering column, said coupling including a clamping arrangement normally to clamp the two portions together and there being means to release the clamping arrangement upon forcible shifting of said lower portion towards said upper portion, thereby to disconnect the two portions.

In one preferred form, the releasable coupling includes a profiled shaft which fits in a correspondingly-shaped yoke and is held in position by a clamp plate. The profiled shaft carries means to strike the clamp plate clear, thereby to release the coupling, upon forcible shifting of the profiled shaft in its yoke in a direction towards the upper portion of the steering column.

In another form, the releasable coupling includes two plate-like members, one being provided on the upper end of said lower portion of the steering column and the other being provided on the lower end of said upper portion of the steering column and the two plate-like members being releasably secured together. The two members can be secured together by bolts which are located in open slots so that, when force is applied to the member at the end of the lower portion in a direction towards the upper portion, the bolts are driven out of their respective slots, thereby to decouple the two portions.

For a better understanding of the invention, and to show how the same may be carried into effect, reference will now be made, by way of example, to the accompanying drawings, in which:

FIG. 2 is a side view, partly in section, of a first embodiment of steering column decoupling means;

FIG. 3 is a sectional view taken on the line III—III of FIG. 2;

FIG. 4 is a perspective view of a clamping plate illustrated in FIG. 2 and FIG. 3;

Figure 11:
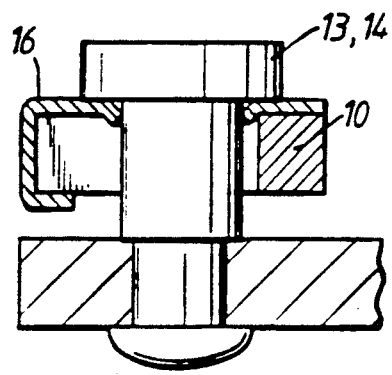
Figure 12:
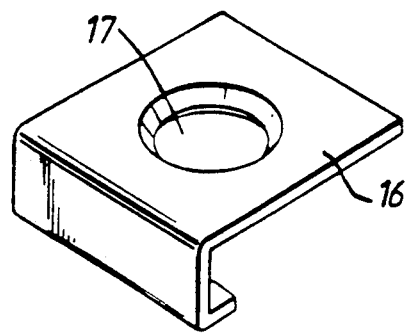
Figure 13:
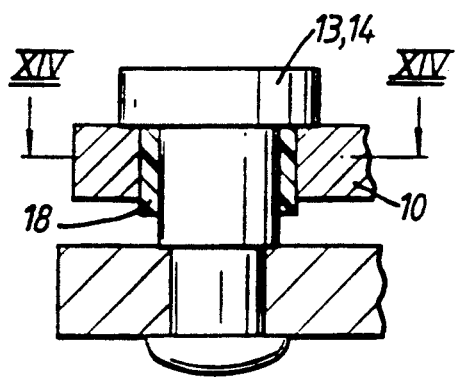
Figure 15:
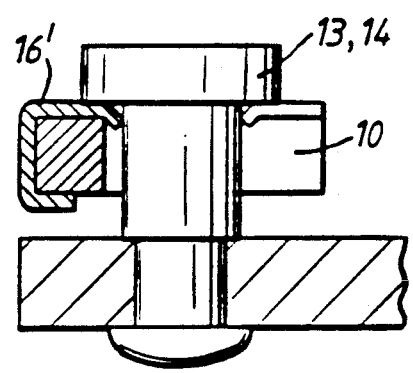
Figure 14:
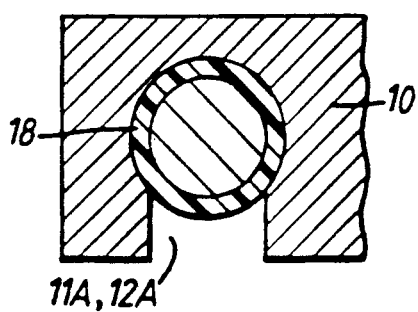
Figure 16:
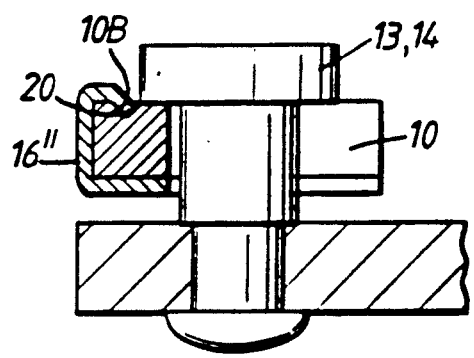
Figure 17:
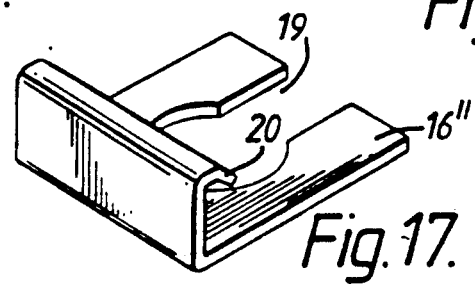
Figure 21:
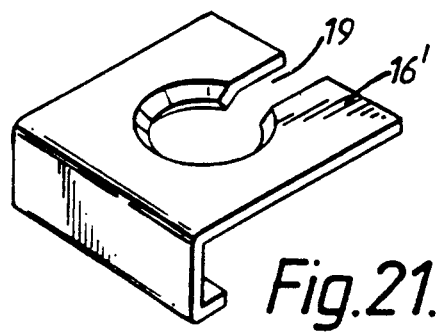

FIGS. 5A, 5B, and 5C illustrate further forms of profile which a profiled shaft illustrated in FIG. 2 and FIG. 3 can take;

FIG. 6 is a view similar to FIG. 2, showing a modified form of the embodiment illustrated therein;

FIG. 7 and FIG. 8 are views similar to FIG. 2, illustrating operation of the decoupling means;

FIG. 9 and FIG. 10 are respectively a diagrammatic side view, partly in section, and perspective view, of a modified form of release means for the clamping arrangement;

FIG. 11 is a sectional side view of part of the releasable coupling and showing a clamp plate retaining clip which can be incorporated;

FIG. 12 is a perspective view of the retaining clip shown in FIG. 11;

FIG. 13 is a view similar to FIG. 11 illustrating an alternative method of clamp plate retention;

FIG. 14 is a view taken on the line XIV—XIV of FIG. 13;

FIG. 15 is a sectional side view showing another form of clamp plate retention, using a retaining clip such as that shown in FIG. 21;

FIG. 16 is a view similar to FIG. 15 showing another form of clamp plate retention;

FIG. 17 is a perspective view of a retaining clip illustrated in FIG. 16.

Figure 18:
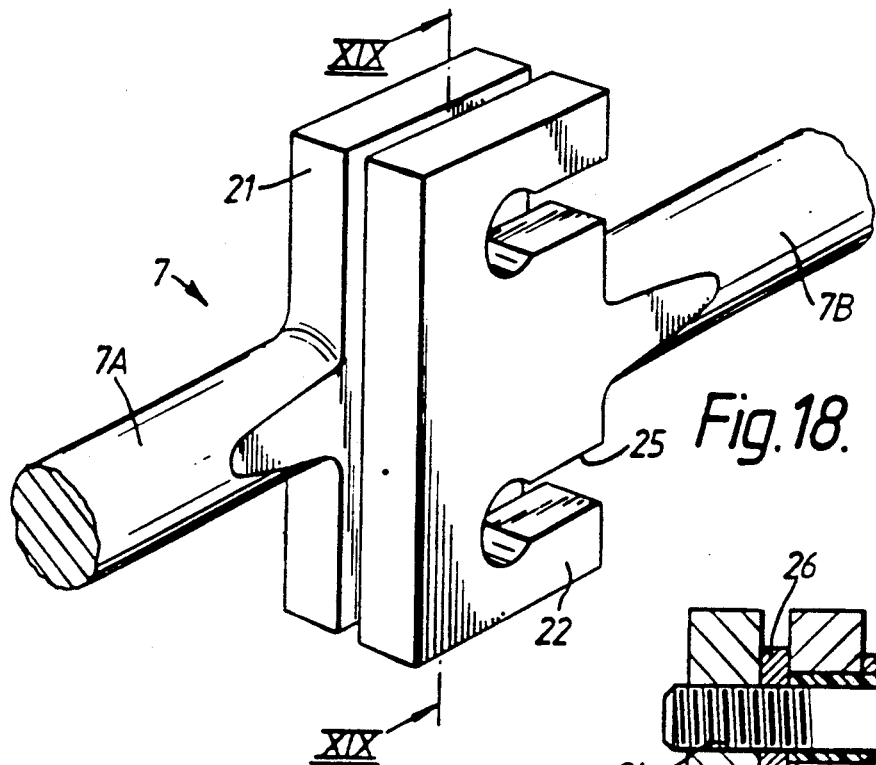
Figure 19:
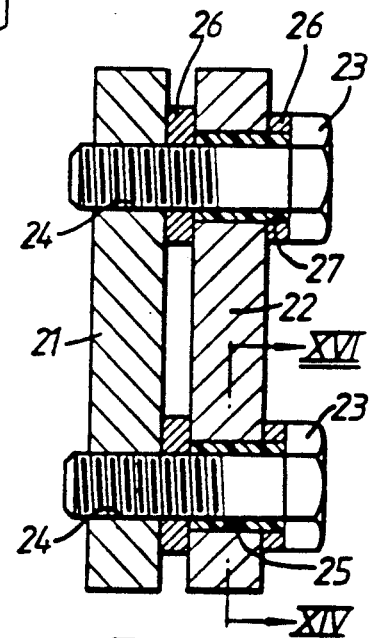
Figure 20:
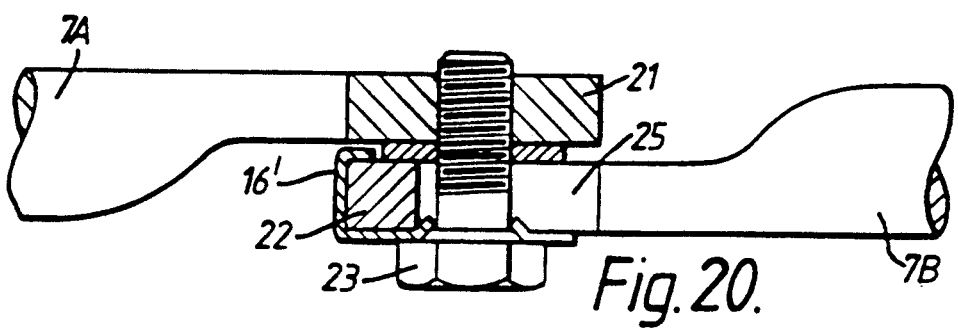
Figure 22:
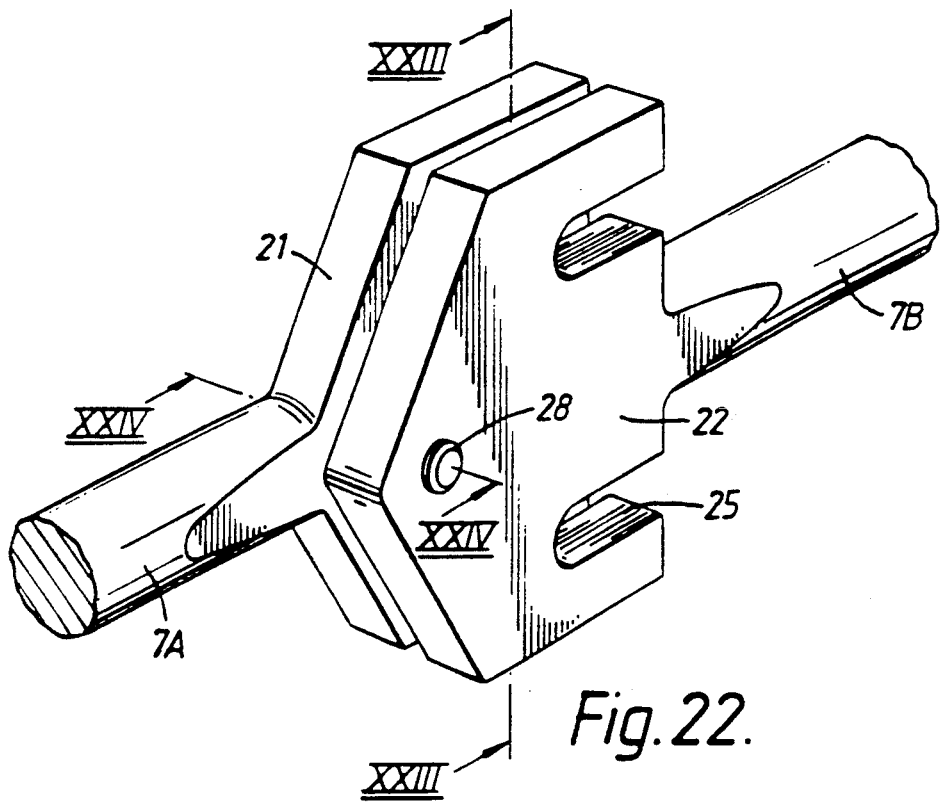
Figure 23:
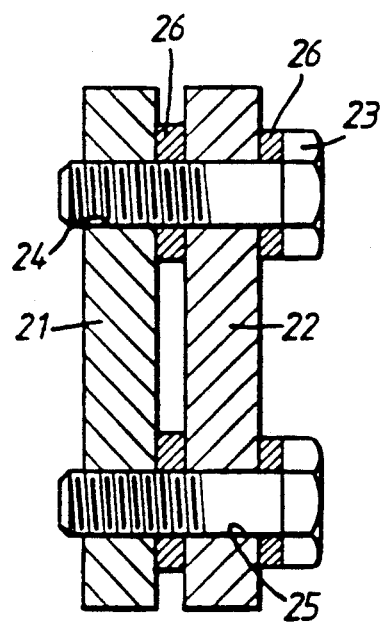
Figure 24:
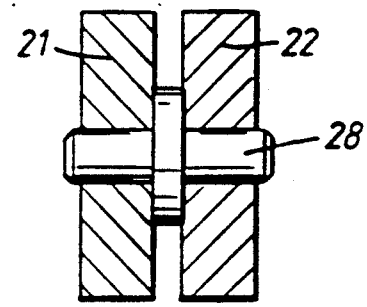
Figure 29A:
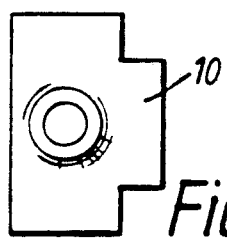
Figure 29B:
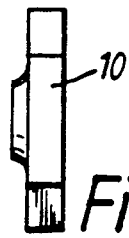
Figure 30:
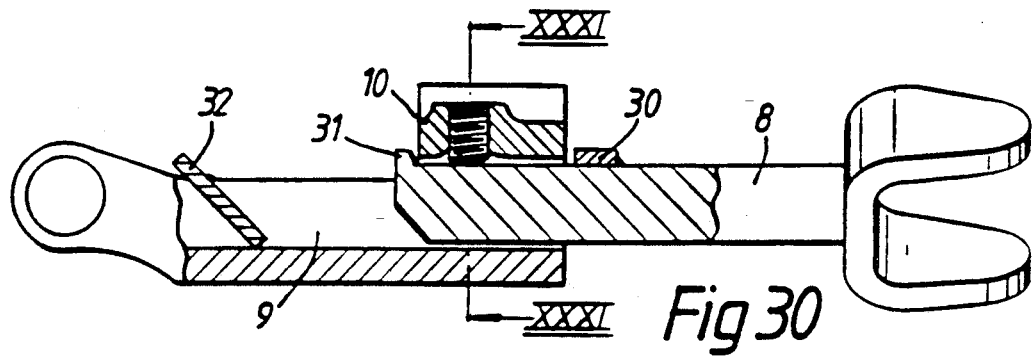
Figure 31:
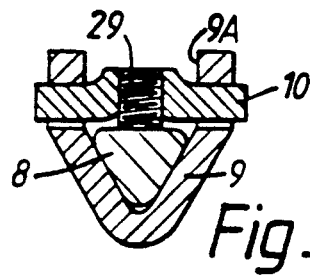
Figure 32:
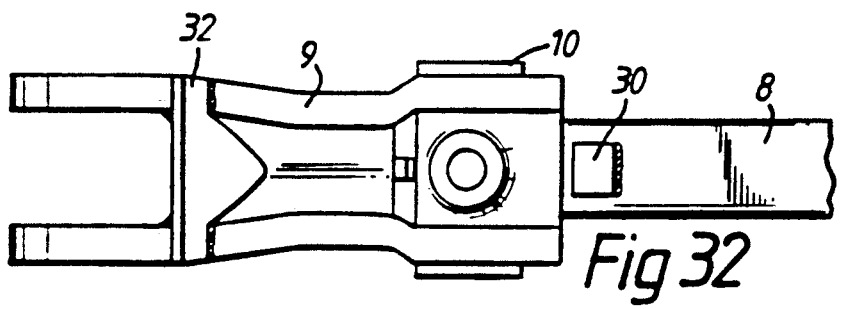

FIG. 18 is a diagrammatic perspective view of part of a vehicle steering column incorporating a second major embodiment of means to decouple it in the event of a frontal impact of the vehicle;

FIG. 19 is a sectional view taken on the line XIX—XIX of FIG. 18 (FIG. 14 being a corresponding view through line XIV—XIV of FIG. 19) and illustrating one method of initial location of the components;

FIG. 20 is a sectional side view illustrating another method of location of the components;

FIG. 21 is a perspective view of a retaining clip illustrated in FIG. 18, the retaining clip being the same as that used in the form illustrated in FIG. 15;

FIG. 22 is a view similar to FIG. 18 showing a modified form of an embodiment of decoupler shown in FIG. 18;

FIG. 23 is a sectional view taken along XXIII—XXIII of FIG. 22;

FIG. 24 is a sectional view taken along the line XXIV—XXIV of FIG. 22;

FIG. 25 is a plan view of yet another embodiment of steering column decoupling means;

FIG. 26 is a sectional end view taken on the line XXVI—XXVI in FIG. 25;

FIG. 27 is a side view of part of the construction illustrated in FIG. 25 and FIG. 26;

FIG. 28 is a view similar to FIG. 26 illustrating a modified version of the embodiment shown in that FIG. 26;

FIGS. 29A and 29B are respectively a plan and edge view of a clamping plate shown in a further embodiment illustrated in FIG. 30;

FIG. 30 is a view similar to FIG. 25 of that further embodiment;

FIG. 31 is a sectional view taken on the line XXXI—XXXI in FIG. 30;

FIG. 32 is a plan view of part of the construction illustrated in FIG. 30; and

Figure 33A:
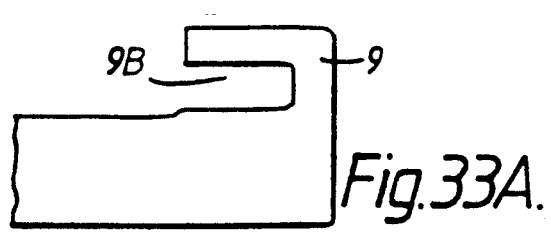
Figure 33B:
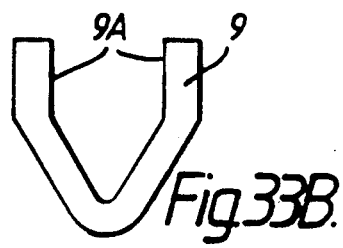

FIGS. 33A and 33B are respectively a side view and an end view of a vee yoke illustrated in FIGS. 30-32.

Figure 1:
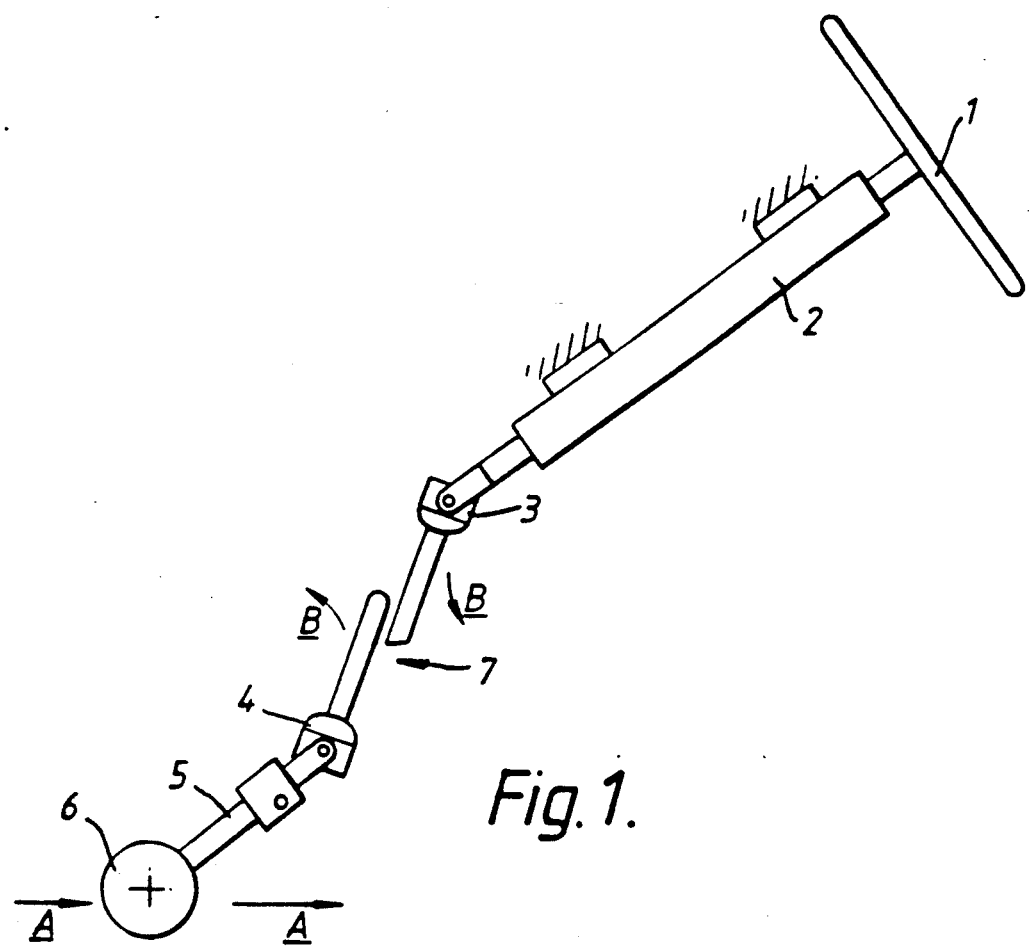
FIG. 1 is a diagrammatic view of a vehicle steering column incorporating a decoupler.

Referring to the drawings and firstly to FIG. 1, a vehicle steering column is diagrammatically illustrated which incorporates means to decouple it in the event of a frontal impact of the vehicle, in order to prevent the crash forces from reaching the upper steering column.

Visible in FIG. 1 is a steering wheel 1 mounted in a fixed, upper portion of a steering column 2 which is coupled via universal joints 3 and 4 to a lower portion 5 of the steering column. The lower portion 5 is coupled to a steering rack 6.

Between the universal joints 3 and 4 is an intermediate shaft 7 which incorporates means according to the present invention to decouple the steering column in the event of a frontal impact of the vehicle, which would result in movement of the steering rack 6 towards the passenger compartment as the engine and suspension moves on crashing, as illustrated by the arrows A in FIG. 1. The arrows B illustrate movement of the parts of the intermediate shaft upon decoupling so that no high force is transmitted to the upper steering column portion 2.

Referring to FIGS. 2 through 5, a first embodiment of decoupling means is illustrated incorporated in the intermediate shaft 7 and includes a vee shaft 8 which fits in a vee yoke 9 and is held in position by a clamping plate 10.

The clamping plate 10 comprises two open slots 11 and 12 to receive a rivet 13 and screw 14, respectively. Thus, one end of the clamping plate is retained by the rivet 13, whilst the clamping force between the shaft 8 and yoke 9 is provided by the screw 14.

A device is provided to release the clamping arrangement upon forcible shifting of the lower portion 5 of the steering column towards the upper portion 2, basically in the direction of the arrows A in FIG. 1. The device, as is illustrated in FIG. 2, is a pin 15 set in the upper surface of the shaft 8. Upon crashing, the shaft 8 slides in the yoke 9 and the pin 15 strikes the clamping plate 10 and pushes the plate until it decouples (see also FIG. 7 and FIG. 8). The location 10A in FIG. 4 illustrated the point of contact of the pin 15. The decoupling force can be adjusted to meet individual applications by setting the torque of the clamping screw 14 and by varying the sliding face material such as metal-to-metal, plastics coating, paint finish, electroplated finish, phosphate or low slip materials such as PTFE, or any combination thereof. The shaft 8 need not have a vee shape but could have other possible shapes as illustrated in FIGS. 5A, 5B, and 5C. In each case, there is a controlled point contact such as that shown at 8A in FIG. 5B.

FIG. 6 illustrates a modification of the embodiment shown in FIG. 2, where the pin 15 is spaced further away from the end of the shaft 8 where the clamping plate 10 is located and the shaft 8 is provided with a relieved flat 8A directly behind the clamping plate 10 as viewed in the direction of decoupling. Upon crashing, the vee shaft 8 slides in the vee yoke 9 and the force between the clamping plate 10 and shaft 8 is relieved when the flat 8A is directly under the clamping plate 10. This has the effect of loosening the clamping plate 10 to reduce to a minimum the decoupling force required by the pin 15.

FIG. 7 and FIG. 8 illustrate the decoupling action on crash. On impact, the shaft 8 and yoke 9 move towards one another, the pin 15 strikes the clamping plate 10 which consequently slides under the rivet 13 and screw 14 and the complete unit decouples, the shafts 8 and 9 riding over and clear of one another.

FIG. 9 and FIG. 10 illustrate another possible device to release the clamping arrangement. Instead of the pin 15, a raised flat face 8B is provided on the upper side of the shaft 8, the flat face 8B serving to push the clamping plate 10 off straight, striking as it will substantially the whole of the area referenced 10A in FIG. 4.

FIGS. 11 to 17 illustrate various options of achieving initial clamping plate retention to ensure that the initial assembly of the releasable coupling unit is correct.

FIG. 11 and FIG. 12 show the rivet 13 or screw 14 in the clamping plate 10 and a retaining clip 16 with a hole 17 in it in which the shaft of the rivet or screw can be located. The clip 16 is a metal clip and its purpose is to locate the clamping plate 10 and the rivet or screw. On crash, the clamping plate 10 leaves the clip 16 in position on the rivet or screw.

FIG. 13 and FIG. 14 show another form which replaces the clip 16 by a plastics bush 18 which is supplied both for the rivet 13 and the screw 14. The outside diameter of the bush 18 is larger than the width of the narrowed portions 11A and 12A of the slots 11 and 12. However, the width of each portion 11A, 12A is larger than the shaft of the rivet or screw which it is intended to receive. Consequently, on crash, the clamping plate 10 shears through the bushes 18.

FIG. 15 shows a form of retaining clip 16' (illustrated in FIG. 22) which itself is provided with an open slot 19 so that, on crash, the clamping plate 10 takes the clip 16' with it, the slot 19 opening out as the shaft of the rivet or screw is driven through it.

FIG. 16 and FIG. 17 illustrate another form of retaining clip 16" which has a bent-over portion 20 which fits in a V-shaped indent 10B in the upper surface of the clamping plate 10. Thus, the retaining clip is held more firmly on the clamping plate 10 and, on crash, again the clamping plate 10 will take the clip 16" with it and the slot 19 opens out as with the embodiment illustrated in FIG. 15 and FIG. 21.

Turning now to FIG. 18 and FIG. 19, a second major embodiment of steering column decoupler is illustrated. Here, the intermediate shaft 7 of the steering column is divided into two shaft portions 7A and 7B which each terminate in plate-like members 21 and 22, respectively, which are bolted together by means of a pair of bolts 23. To receive the bolts, the member 21 has a pair of threaded bores 24, whilst the member 22 has a pair of open slots 25 which terminate in bolt holes where the bolts 23 pass into the bores 24 of the member 21 below the member 22. Washers 26 are provided between the heads of the bolts 23 and the member 21 and between the members 21 and 22 themselves. The bolts 23 are tightened to clamp the members 21 and 22 together and, therefore, the shaft portions 7A and 7B and it can be seen that the construction allows for decoupling of this clamping arrangement between the two shafts upon impact of the vehicle. The decoupling force can be adjusted to individual applications by setting the bolt torques and varying the sliding face material between the various interfaces. For example, the interfaces can be metal-to-metal, plastics coated, a paint finish, electroplated, have a coating of phosphate or low slip material such as PTFE or any combination of these.

As shown in FIG. 19, provision is made to ensure that initial assembly of the unit is correct, this being achieved by providing a plastics bush 27 on each bolt 23. This plastics bush performs the same function as the plastics bush 18 shown in FIG. 14 and indeed the relative dimensions between the bolt/screw/rivet and the bush (18, 27) and the slot in which they are located as described above are applicable both to the application of FIG. 14 and that of FIG. 19. In the latter case also, the bush 27 is sheared through by the shaft plate member 22 upon impact.

FIG. 20 and FIG. 21 show a modified construction to ensure that the initial assembly of the unit is correct. In this form, instead of the plastics bushes 27, the retainer clip 16' (already described for use with the construction shown in FIG. 15), is fitted in an inverted position on the shaft portion 7B. As with that earlier example, the plate member 22 of the shaft portion 7B on which the clip is mounted, takes the clip with it and the slot 19 in the clip is opened up by the shaft of the bolt 23.

Referring now to FIGS. 22 through 24, the embodiment here is a modified form of the embodiment shown in FIG. 18 and FIG. 19 and avoids the need for location devices such as the plastics bushes 27 (FIG. 19) and the metal clips 16' (FIG. 20 and FIG. 21). In the embodiment of FIGS. 22 through 24, prelocation of the plate members 21 and 22 of the shaft portion 7A and 7B, respectively, prior to the assembly of the bolts 23 is achieved by the provision of a plastics shear pin 28 which is located to pass through both plate members 21 and 22. Another washer 26 can be located between the members 21 and 22 around the shear pin 28.

As well as prelocating the shafts prior to the assembly of the bolts, the shear pin 28 prevents the parts from being assembled incorrectly and helps to give stiffness to the unit.

In other respects, the embodiment of FIGS. 22 through 24 corresponds to that of FIG. 18 and FIG. 19.

The embodiments shown in FIGS. 25 to 33 have a likeness to the embodiments of FIGS. 1 through 17, in that a clamping plate 10 is provided. In the embodiment of FIGS. 25 through 27, the clamping plate 10 has outer side edges which are bent over towards one another to form a wrap-around clamping plate 10 which wraps-around lateral edges of a vee yoke 9 in which a vee shaft 8 is seated. The shaft 8 is clamped on to the yoke 9 by means of a tensioning screw 29 threaded in a bore in the upper surface of the clamping plate 10. The screw 29 is tightened to a set torque.

The upper surface of the shaft 8, i.e., the surface which is not seated in the vee shaft 9, is provided close to one edge of the clamping plate 10 with a clamping plate striking block 30. The opposite edge of the clamping plate 10 is arranged to abut against a stop member 31 also provided on the upper surface of the shaft 8 at its free end.

The well of the vee yoke 9 is provided with a deflector plate 32 which extends upwardly out of the vee of the yoke.

The screw 29 can be driven by a hexagonal tool inserted in a hexagonal recess in the screw, whereafter the hexagonal recess can be filled with adhesive to prevent it from being tampered with in service. As with the previous embodiments, the interfaces of the various components which are to move relative to one another can be coated or otherwise treated as hereinbefore described.

Upon vehicle impact, the vee shaft 8 and vee yoke 9 are forceably urged towards one another and the striking block 30 drives the clamping plate 10 clear and the vee shaft 8 is deflected clear of the assembly by the deflecting plate 32 to give complete decoupling.

The modification illustrated in FIG. 28 is based on the embodiment of FIGS. 25 through 27, except that the vee yoke 9 is shaped to wrap-around the clamping plate 10, instead of the other way around.

The embodiment shown in FIGS. 29 through 33 shows the clamping plate 10 which forms a bridge across the inner side walls 9A of the vee yoke 9. As can be seen in FIGS. 30 through 33, the sidewalls 9A of the yoke extend above the shaft 8 and above the clamping plate 10, the clamping plate slidably fitting in an open-ended, longitudinal slot 9B (FIG. 33A), in the yoke 9.

As with the embodiments of FIGS. 25 to 28, the assembly is tightened by a screw 29 which may also be rendered tamperproof by adhesive as described. Similarly, the various coatings can be applied on the relatively moveable parts.

Again, on impact, the striking block 30 drives the clamping plate 10 clear and decoupling is achieved as the shaft 8 strikes the deflecting plate 32.

If for any reason the screw 29 of the embodiments of FIGS. 25 through 33 becomes loose in service, the clamping plate 10 is retained by the striking block 30 and stop 31.

Having described the invention, what is claimed is:

1. A vehicle steering column incorporating means to decouple it in the event of a frontal impact of the vehicle, comprising:
   a releasable coupling interconnecting upper and lower portions of a steering column, said coupling having a clamping arrangement normally clamping the two portions together, whereby the releasable coupling releases the two portions upon a forcible shifting of said lower portion towards said upper portion; and
   an adjustment means for adjusting the force necessary to release the releasable coupling by increasing the force applied to the clamping arrangement said releasable coupling includes a profiled shaft which fits into a correspondingly-shaped yoke.

2. A vehicle steering column according to claim 1, wherein said reasonable coupling also includes a clamping plate which normally clamps the shaft and the yoke together, the clamping plate being separate from the shaft and the yoke.

3. A vehicle steering column according to claim 2, wherein the profiled shaft carries means to strike the clamping plate clear, thereby to release the coupling, upon forcible shifting of the profiled shaft in its yoke in a direction towards the upper portion of the steering column.

4. A vehicle steering column according to claim 3, wherein said means to strike the clamping plate clear comprises a raised flat face provided on a side of the shaft.

5. A vehicle steering column according to claim 3, wherein said means to strike the clamping plate clear comprises a pin protruding from a surface of the profiled shaft.

6. A vehicle steering column according to claim 2, wherein the profiled shaft is substantially V-shaped in section and the yoke is correspondingly V-shaped.

7. A vehicle steering column according to claim 2 wherein the adjustment means forces the clamping plate toward the yoke, the clamping plate thereby being forced against the shaft.

8. A vehicle steering column according to claim 2, wherein the profiled shaft is provided with a relieved flat directly behind the clamping plate as viewed in the direction of decoupling to relieve the force between the clamping plate and shaft when the flat is directly under the clamping plate.

9. A vehicle steering column according to claim 2, wherein said clamping plate has outer edges which are bent over towards one another so that the clamping plate wraps-around side edges of the yoke.

10. A vehicle steering column according to claim 9, wherein the clamping plate is tightened on to said profiled shaft and yoke by means of a screw which extends from a threaded bore in the clamping plate and tightened on the profiled shaft.

11. A vehicle steering column according to claim 10, wherein said screw has a recess in it for receiving an operating tool and wherein, after having been tightened to the required tension, the recess is filled with a material to prevent tampering with the screw.

12. A vehicle steering column according to claim 2, wherein the yoke has side edges which are shaped to wrap around the clamping plate.

13. A vehicle steering column according to claim 2, wherein said yoke has side edges which extend above said profiled shaft and above said clamping plate, the clamping plate slidably fitting in a longitudinal slot open at one end in said yoke, the clamping plate thereby bridging the yoke.

14. A vehicle steering column incorporating means to decouple it in the event of a frontal impact of the vehicle, comprising:
   a releasable coupling interconnecting upper and lower portions of a steering column, the releasable coupling including a profiled shaft which fits into a correspondingly-shaped yoke and a clamping plate which normally clamps the shaft and yoke together, the clamping plate having two open slots to receive fastening means, the fastening means securing the clamping plate to the yoke; and
   means to release the clamping plate upon forcible shifting of said lower portion towards said upper portion, thereby to disconnect the two portions.

15. A vehicle steering column according to claim 14, wherein the profiled shaft is provided with a relieved flat directly behind the clamping plate as viewed in the direction of decoupling to relieve the force between the clamping plate and shaft when the flat is directly under the clamping plate.

16. A vehicle steering column according to claim 14, wherein the profiled shaft is substantially V-shaped in section and the yoke is correspondingly V-shaped.

17. A vehicle steering column according to claim 14, wherein the profiled shaft carries means to strike the clamping plate clear, thereby to release the releasable coupling, upon forcible shifting of the profiled shaft in its yoke in a direction towards the upper portion of the steering column.

18. A vehicle steering column according to claim 14, wherein a retaining clip has a hole in which the fastening means can be located.

19. A vehicle steering column according to claim 18, wherein said clamping plate is provided with an indent to receive a corresponding portion of the retaining clip in order to provide a firmer hold of the retaining clip on the clamping plate upon decoupling.

20. A vehicle steering column according to claim 14, wherein a retaining clip has an open slot in which the fastening means can be located.

21. A vehicle steering column according to claim 14, wherein a bush for each slot in the clamping plate is provided to receive the fastening means.

* * * * *

UNITED STATES PATENT AND TRADEMARK OFFICE
CERTIFICATE OF CORRECTION

PATENT NO. : 5,074,161
DATED : December 24, 1991
INVENTOR(S) : Michael T. Hancock It is certified that error appears in the above—identified patent and that said Letters Patent is hereby corrected as shown below:

In Column 4, line 8 of the patent, change "22" to --21--

Signed and Sealed this

Thirtieth Day of March, 1993

Attest:

STEPHEN G. KUNIN

Attesting Officer         Acting Commissioner of Patents and Trademarks